US006874361B1

(12) United States Patent
Meltz et al.

(10) Patent No.: US 6,874,361 B1
(45) Date of Patent: Apr. 5, 2005

(54) DISTRIBUTED FLOW PROPERTIES WELLBORE MEASUREMENT SYSTEM

(75) Inventors: Gerald Meltz, Avon, CT (US); Neal G. Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/754,064

(22) Filed: Jan. 8, 2004

(51) Int. Cl.$^7$ .............................................. E21B 41/10
(52) U.S. Cl. ................................................. 73/152.32
(58) Field of Search ............................. 73/19.1, 19.09, 73/24.01, 24.06, 61.79, 152.32, 861.18, 861.27, 861.28, 861.29; 175/48, 40; 166/250.01; 367/27

(56) References Cited

U.S. PATENT DOCUMENTS

| | | | |
|---|---|---|---|
| 4,080,837 A | | 3/1978 | Alexander et al. |
| 4,596,133 A | | 6/1986 | Smalling et al. |
| 4,733,233 A | * | 3/1988 | Grosso et al. ................ 367/82 |
| 4,806,012 A | | 2/1989 | Meltz et al. |
| 4,856,321 A | | 8/1989 | Smalling et al. |
| 4,996,419 A | | 2/1991 | Morey |
| 5,163,321 A | | 11/1992 | Perales |
| 5,200,894 A | | 4/1993 | McCoy et al. |
| 5,741,978 A | | 4/1998 | Gudmundsson |
| 5,747,749 A | | 5/1998 | Bednarczyk et al. |
| 5,754,495 A | | 5/1998 | Skinner |
| 5,777,278 A | | 7/1998 | Bednarczyk et al. |
| 6,151,958 A | | 11/2000 | Letton et al. |
| 6,209,388 B1 | | 4/2001 | Letton et al. |
| 6,321,838 B1 | | 11/2001 | Skinner |
| 6,354,147 B1 | | 3/2002 | Gysling et al. |
| 6,384,738 B1 | | 5/2002 | Carstensen et al. |
| 6,401,814 B1 | * | 6/2002 | Owens et al. ............. 166/253.1 |
| 6,450,037 B1 | | 9/2002 | McGuinn et al. |
| 2002/0140573 A1 | | 10/2002 | Carstensen et al. |

FOREIGN PATENT DOCUMENTS

WO  WO 2004/009957 A1  1/2004

OTHER PUBLICATIONS

Sabeus, "Borehole Pressure & Temperature Monitoring System", dated 2003.
Sabeus, "Multi–Point Temperature System", date 2003.
Sabeus Sensor Systems Division, Sabeus Photonics, Inc., "Fact Sheet", dated Oct. 7, 2002.
R&D Review of Toyota CRDL, vol. 37, No. 1, "Improvement in Pressure–Sensitive Paint by Employing Metal Oxide–Polymer Composite Binder", dated 2002.
M.J. Gander et al., "Pressure Measurments at a Nozzle Guide Vane Edge Using Embedded Fibre Optic Sensors", dated Sep. 2002.
Springer–Verlag, "Pressure–sensitive Paint Measurements in a Shock Tube", dated 2000.
ISSI, "Pressure and Temperature Sensitive Paint Measurements", dated 1998–1999.
ISSI, "PSP Summary", undated.
U.S. Appl. No. 10/008,503, filed Nov. 8, 2001.
Sigma Enterprises, "HalSonics Acoustic Pulse Generator", undated.
HalSonics, "Surface Operated Non–Intervention Completion Systems", dated 2001.

(Continued)

Primary Examiner—Robert Raevis
(74) Attorney, Agent, or Firm—Marlin R. Smith (57) ABSTRACT

A distributed flow properties wellbore measurement system. In a described embodiment, a system for determining at least one parameter of a fluid in a tubular string includes a pressure pulse generator attached to the tubular string and a set of sensors. The generator transmits a pressure pulse through the fluid. The set of sensors is used to determine a velocity of the pressure pulse transmitted through the fluid, and to determine a velocity of the pressure pulse reflected back through the fluid.

92 Claims, 4 Drawing Sheets

OTHER PUBLICATIONS

OFS Postdeadline Papers, "Fabricating fiber Bragg gratings with tailored spectral properties for strain sensor arrays using a post–exposure rescan technique", dated May 2002.

IEEE Journal of Lightwave Technology, "Fiber Grating sensors", dated 1997.

Markland, "Production and Reservoir Management", undated.

SPE 56584, "Gas–Liquid Metering Using Pressure–Pulse Technology", Oct. 1999.

* cited by examiner

DISTRIBUTED FLOW PROPERTIES WELLBORE MEASUREMENT SYSTEM

BACKGROUND

The present invention relates generally to equipment utilized and operations performed in conjunction with subterranean wells and, in an embodiment described herein, more particularly provides a distributed flow properties wellbore measurement system.

Fluid flow rates, fluid compositions and other properties can presently be monitored in a well using specially constructed sensors. Unfortunately, these special sensors are many times very expensive to manufacture, complex, failure-prone, difficult to install, etc.

One flowmeter known in the art uses frequency sensing transducers to sense ultrasonic noise in fluid flowing through a pipe. The noise is due to turbulence in the fluid flow itself. One disadvantage of this flowmeter is that it relies on the noise (or at least a unique portion of the noise frequency spectrum) continuing substantially unchanged along the length of the pipe.

Thus, it may be seen that improved systems and methods for determining fluid properties are needed.

SUMMARY

In carrying out the principles of the present invention, in accordance with an embodiment thereof, a means of determining fluid properties or parameters is provided which is relatively uncomplicated to construct and use, and economical and convenient to install and operate. Fluid parameters at various locations distributed along a wellbore, or in multiple wellbores, may be easily determined using the principles of the invention.

In one aspect of the invention, a system for determining at least one parameter of a fluid in a tubular string is provided. The system includes a pressure pulse generator attached to the tubular string, and a set of sensors. The generator transmits a pressure pulse through the fluid. The set of sensors is used to determine a velocity of the pressure pulse transmitted through the fluid, and to determine a velocity of the pressure pulse reflected back through the fluid. From these velocities, an average velocity of the fluid through the tubular string and a speed of sound in the fluid may be calculated.

In another aspect of the invention, a method of determining at least one parameter of a fluid in a tubular string is provided. The method includes the steps of: transmitting a pressure pulse through the fluid in the tubular string; determining a velocity of the transmitted pressure pulse; reflecting the pressure pulse through the fluid in the tubular string; and determining a velocity of the reflected pressure pulse.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
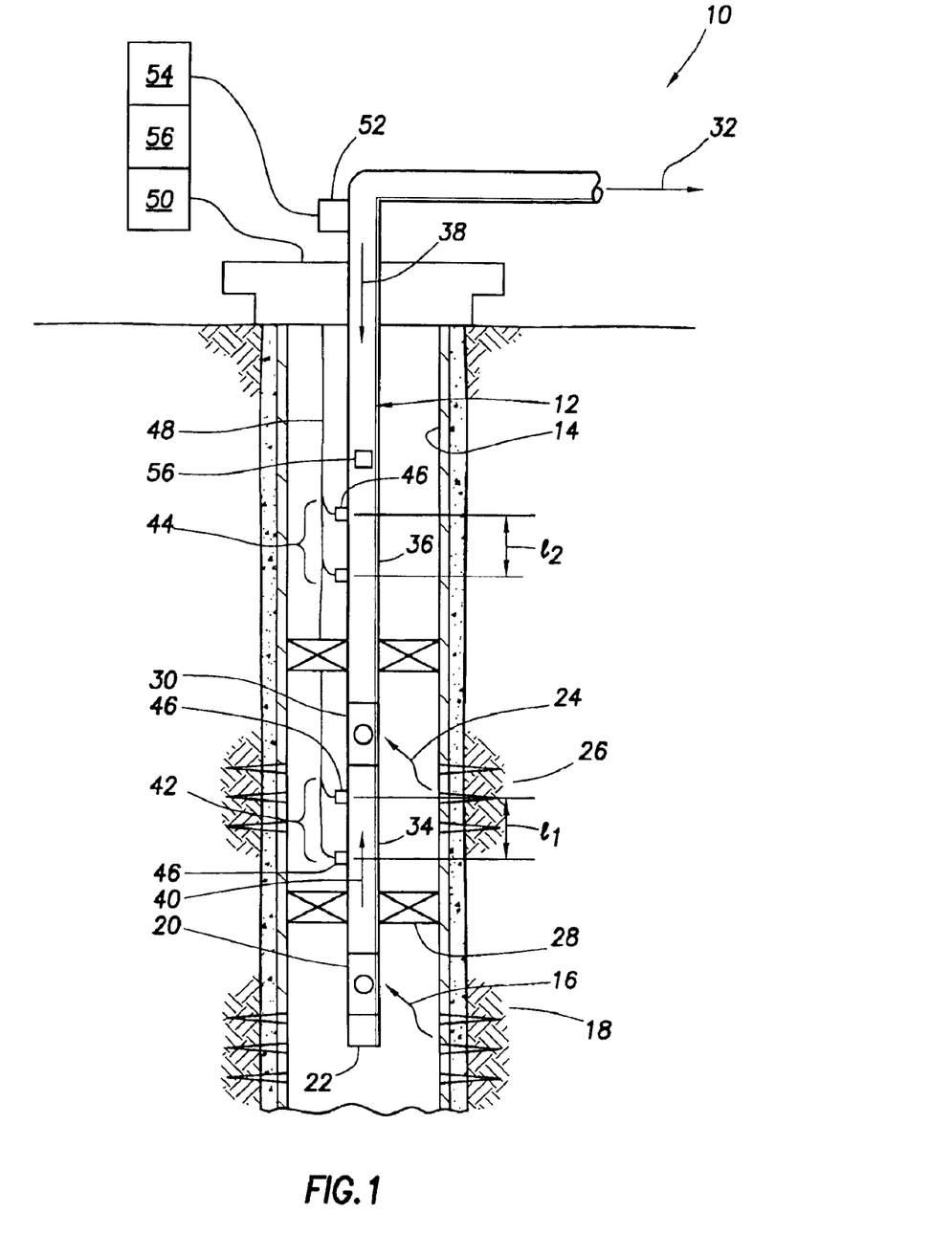
FIG. 1 is a schematic partially cross-sectional view of a system and method embodying principles of the present invention.

Representatively illustrated in FIG. 1 is a system 10 and associated method which embody principles of the present invention. In the following description of the system 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

As depicted in FIG. 1, the system includes a tubular string 12 positioned in a wellbore 14 of a subterranean well. The tubular string 12 is more specifically known as a production tubing string, but the principles of the invention are also applicable to casing strings, liner strings, coiled tubing strings, or any other type of tubular conduit. Thus, it should be clearly understood that the principles of the invention are not limited to any specific details of the embodiments described herein.

Fluid (indicated by arrow 16) enters the tubular string 12 from a zone or formation 18 intersected by the wellbore 14. The fluid 16 could enter the tubular string 12 via a valve 20 or other opening or flow control device interconnected in the tubular string. Alternatively, if a lower end 22 of the tubular string 12 is open, the fluid 16 could flow into the tubular string through the lower end.

As used herein, the term "open" is used to indicate at least partially open, that is, permitting fluid communication therethrough. The open lower end 22 of the tubular string 12 could have a flow area greater than, less than, or equal to that of the remainder of the tubular string.

Fluid (indicated by arrow 24) enters the tubular string 12 from another formation or zone 26 intersected by the wellbore 14. In the wellbore 14 external to the tubular string 12, the fluids 16, 24 are isolated from each other by a packer 28 or other annular sealing device. The fluid 24 enters the tubular string 12 via another valve 30 or other opening interconnected in the tubular string.

The fluids 16, 24 are commingled in the tubular string 12. The commingled fluid (indicated by arrow 32) is produced to the surface. However, it is not necessary in keeping with the principles of the invention for fluid to be produced from a well. Instead, fluid could be injected into a well, into one or more zones intersected by a wellbore, etc.

In the system 10 as depicted in FIG. 1, it is desired to determine a velocity, volumetric flow rate, composition, or other parameters of fluid in the tubular string 12 at various locations along the tubular string. For example, it may be desired to determine a volumetric flow rate and composition of the fluid 16 at a portion 34 of the tubular string 12 downstream of the valve 20. It may also be desired to determine a volumetric flow rate and composition of the commingled fluids 32 at a portion 36 of the tubular string 12 downstream of the valve 30.

If the flow rates of the fluid 16 and of the commingled fluid 32 are known, then the flow rate of the fluid 24 may easily be determined by subtracting the fluid 16 flow rate from the commingled fluid 32 flow rate. Similarly, the composition of the fluid 24 may be determined by finding the differences between the composition of the commingled fluid 32 and the composition of the fluid 16.

In a unique feature of the system 10, these and other parameters of the fluids 16, 24 and 32 may be determined by transmitting a pressure pulse (indicated by arrow 38) through the fluid in the tubular string 12, and reflecting the pressure pulse back through the fluid. The reflected pressure pulse is indicated by arrow 40 in FIG. 1.

Preferably, the pressure pulse 38 is reflected off of the lower end 22 of the tubular string 12. The end 22 may be closed (for example, by a bull plug or bridge plug), or the end may be open. If the end 22 is open, the reflected pressure pulse 40 may be caused by an acoustic impedance mismatch between the interior of the tubular string 12 and the wellbore 14 below the tubular string.

Note that it is not necessary for the pressure pulse 38 to be reflected at the end 22 of the tubular string 12 since other means may be used to reflect the pressure pulse. For example, an impedance mismatch at another portion of the tubular string could be used instead to reflect the pressure pulse.

A set of sensors is positioned at each portion 34, 36 of the tubular string 12 where it is desired to determine parameters of fluid in the tubular string. A set 42 of two sensors 46 is positioned at the tubular string portion 34 to determine parameters of the fluid 16. A set 44 of two sensors 46 is positioned at the tubular string portion 36 to determine parameters of the commingled fluid 32.

Note that it is not necessary for each of the sensor sets 42, 44 to include two sensors (any number of sensors may be used in either set, although preferably at least two sensors are used in each set in order to determine a velocity of the transmitted and reflected pressure pulses 38, 40), and it is not necessary for each sensor set to include the same number or type of sensors. Furthermore, it is not necessary for there to be multiple sets of sensors. Any number of sensor sets may be used in keeping with the principles of the invention.

The sensors 46 may be of any types which are capable of sensing the transmitted and reflected pressure pulses 38, 40. For example, the sensors 46 may be conventional hydrophones or geophones, the sensors may be pressure sensors, strain sensors or accelerometers, the sensors may be fiber optic sensors or electrically operated sensors, and the sensors may also sense ambient temperature and/or pressure, etc. It is not necessary for all of the sensors in a sensor set to sense the same parameter, for example, one sensor could sense pressure, while another sensor in the same sensor set could sense acceleration.

As used herein, the term "ambient" is used to describe parameters, such as temperature and pressure, at times other than when the pressure pulses 38, 40 are acting on the sensors 46. For example, the sensors 46, or any of them, may sense ambient pressure or temperature before and/or after a transmitted or reflected pressure pulse 38, 40 arrives at the sensor(s). While the sensor(s) 46 is sensing the transmitted or reflected pressure pulses 38, 40, the sensor(s) may sense a combination of an ambient parameter and that parameter as affected by the transmitted or reflected pressure pulse. Alternatively, the sensor(s) 46 could sense a parameter only as affected by the transmitted or reflected pressure pulses 38, 40.

The sensors 46 could be part of a conventional Raman scattering distributed temperature sensing system, in which case the sensors could sense a temperature change as each of the pressure pulses 38, 40 arrives at the portions 34, 36. Alternatively, or in addition, an array of fiber Bragg grating temperature sensors could be used to sense temperature changes due to the pressure pulses 38, 40. A suitable temperature sensing system is the Multi-Point Temperature System available from Sabeus Photonics, Inc. of Chatsworth, Calif.

The sensors 46 could be part of a Brillouin distributed strain sensing system, in which case the fiber optic line 48 could be wrapped about the tubular string 12 at multiple locations at each of the portions 34, 36.

The sensors 46 could include a chemical composition which responds to pressure in order to sense the pressure pulses 38, 40. Suitable chemical compositions include pressure sensitive paints or pressure sensitive coatings. Such pressure responsive chemical compositions are known which are based on oxygen quenching of luminescent molecules dispersed in a thin film. A pressure change causes the oxygen concentration in the film to change and immediately produces a change in an intensity of light emitted by the molecules. A CCD or CMOS detector may be used to spatially resolve the changes in light intensity and thereby resolve the pressure changes along the film in order to determine the pressure pulse velocity. A suitable pressure sensitive paint is available from Innovative Scientific Solutions, Inc. of Dayton, Ohio.

Preferably, the sensors 46 are strain sensing fiber optic sensors, such as the sensor described in U.S. patent application Ser. No. 10/008,503, filed Nov. 8, 2001, the entire disclosure of which is incorporated herein by this reference.

The sensors 46 are preferably connected to a single fiber optic line 48 extending from the sensors 46 along the tubular string 12 to a fiber optic signal transmitter/receiver 50 at the surface or another remote location, in which case the optical signals transmitted through the fiber optic line are preferably multiplexed. Alternatively, multiple fiber optic lines may be used, with a separate line being connected to each sensor 46, or to each sensor set 42, 44.

Each of the sensors 46 senses when the transmitted and reflected pressure pulses 38, 40 arrive at the sensor, and in response the sensor transmits a signal to the receiver/transmitter 50. This signal gives an indication of a time of arrival of each of the pressure pulses 38, 40 at each sensor 46. The time of arrival may correspond to a leading edge of the signal output by a sensor, to a threshold amplitude of the signal, or to any other characteristic of the signal.

As described more fully below, it is actually the difference between the times of arrival of each of the pressure pulses 38, 40 at the sensors 46 of each set of sensors 42, 44 which is used to calculate the velocities of the pressure pulses 38, 40 in the fluid in the tubular string 12. In analyzing the signals output by the sensors 46, techniques such as cross-correlation may be used to compare the signals output by multiple sensors to determine the difference in the times of arrival at the sensors.

As depicted in FIG. 1, and since the well is a producing well, the transmitted pressure pulse 38 travels in a direction opposite to that of the fluids 16, 24 in the tubular string 12, and the reflected pressure pulse 40 travels through the tubular string in the same direction as the fluids in the tubular string. However, it should be clearly understood that these relative directions of travel are not necessary in keeping with the principles of the invention. For example, if the well were an injection well or a combination injection/production well, or if the pressure pulse were transmitted or reflected from different locations in the well, then the transmitted pressure pulse 38 could travel in the same direction as the fluids 16, 24 in the tubular string 12 and/or the reflected pressure pulse 40 could travel in a direction opposite to that of the fluids in the tubular string.

In the system 10 as depicted in FIG. 1, each of the sensor sets 42, 44 includes two of the sensors 46 spaced apart along the tubular string 12. The sensors 46 of the sensor set 42 are separated by a distance l1, and the sensors of the sensor set 44 are separated by a distance l2. The distances l1 and l2 may be the same, or they may be different. Note that any number of sensors may be included in either of the sensor sets 44, 46.

The difference between the times of arrival of the transmitted pressure pulse 38 at each sensor 46 of the sensor set 42 may be used to calculate the velocity of the transmitted pressure pulse at the tubular string portion 34. That is, the distance l1 between the sensors 46 divided by the difference between the times of arrival at the sensors equals the velocity of the transmitted pressure pulse 38. This relationship is represented by the following equation:

$$U_- = l1/\Delta t_- \quad (1)$$

where $U_-$ is the velocity of the transmitted pressure pulse 38, l1 is the distance between the sensors 46, and $\Delta t_-$ is the difference between the time of arrival of the transmitted pressure pulse at one of the sensors and the time of arrival of the transmitted pressure pulse at the other of the sensors.

Similarly, the difference between the times of arrival of the reflected pressure pulse 40 at each sensor 46 of the sensor set 42 may be used to calculate the velocity of the reflected pressure pulse at the tubular string portion 34. That is, the distance l1 between the sensors 46 divided by the difference between the times of arrival at the sensors equals the velocity of the reflected pressure pulse 40. This relationship is represented by the following equation:

$$U_+ = l1/\Delta t_+ \quad (2)$$

where $U_+$ is the velocity of the reflected pressure pulse 40, l1 is the distance between the sensors 46 as before, and $\Delta t_+$ is the difference between the time of arrival of the reflected pressure pulse at one of the sensors and the time of arrival of the reflected pressure pulse at the other of the sensors.

The velocities of the transmitted and reflected pressure pulses 38, 40 at the tubular string portion 34 may now be used to calculate an average velocity of fluid flowing through the tubular string portion, since the average velocity of the fluid equals one half of the difference between the velocities of the transmitted and reflected pressure pulses 38, 40. This relationship is represented by the following equation:

$$U = (U_+ - U_-)/2 \quad (3)$$

where U is the average velocity of the fluid in the tubular string portion 34.

Similarly, the average velocity of the fluid in the tubular string portion 36 may be calculated using the difference between the times of arrival of the transmitted and reflected pressure pulses 38, 40 and the distance l2 between the sensors 46 of the sensor set 44. Thus, the velocity of the fluid in the tubular string 12 may be determined at various different locations distributed along the tubular string.

The volumetric flow rate of the fluid at each location may be determined by multiplying the velocity of the fluid at that location by the cross-sectional area of the interior of the tubular string 12 at that location. This relationship is represented by the following equation:

$$V = U \times A \quad (4)$$

where V is the volumetric flow rate of the fluid and A is the cross-sectional area of the interior of the tubular string 12.

Thus, the volumetric flow rate at each of the portions 34, 36 may be readily determined. The difference between these volumetric flow rates would correspond to the volumetric flow rate of the fluid 24 added to the tubular string 12 between the portions 34, 36 (or discharged from the tubular string in the case of fluid being injected into the wellbore 14).

The average speed of sound in the fluid in the tubular string 12 may be calculated as half of the sum of the velocities of the transmitted and reflected pressure pulses 38, 40. This relationship is represented by the following equation:

$$a = (U_+ + U_-)/2 \quad (5)$$

where a is the average speed of sound or acoustic velocity in the fluid.

The composition of the fluid in the tubular string 12 at each of the portions 34, 36 may also be calculated from the acoustic velocity in the fluid, if the acoustic velocity in each of the components of the fluid and the density of each component is known. For example, the composition, or volume fraction, of each component in a two-component mixture of fluids is known to depend only on the average acoustic velocity in the mixture of fluids, the density of each component, and the acoustic velocity in each of the components. This relationship is described in further detail in U.S. Pat. No. 4,080,837, the entire disclosure of which is incorporated herein by this reference. The acoustic velocity in each of the components of the fluid and the density of each component may be known from testing samples of the components at the surface, from previous research, from computational models, etc.

In some circumstances, it may be possible to calculate the volumetric flow rate at the different portions 34, 36 of the tubular string 12 using the velocity ($U_-$) of the transmitted pressure pulse 38, even if the reflected pressure pulse 40 is not used or its velocity ($U_+$) is not known. For example, if the composition of the fluid in the tubular string 12 is known and, thus, its bulk modulus and acoustic velocity are known, then the difference between its acoustic velocity (a) and the velocity ($U_-$) of the transmitted pressure pulse 38 as determined in the system 10 is due to the velocity of the fluid in the tubular string.

It is beneficial to be able to compensate for temperature when calculating acoustic velocity of a fluid. For this purpose, the system 10 includes the capability of sensing the temperature at each of the tubular string portions 34, 36.

Each of the sensors 46 may include a temperature sensing capability, such as a thermocouple or fiber optic temperature sensor. Alternatively, or in addition, the fiber optic line 48 may include a temperature sensing capability, such as distributed temperature sensing as described in U.S. Pat. No. 5,163,321, the entire disclosure of which is incorporated herein by this reference. If the sensors 46 are fiber optic sensors, then ambient pressure and/or temperature may be sensed by transmitting light through the fiber optic line 48.

If the sensors 46 include a pressure responsive chemical composition, the chemical composition may also, or alternatively, be temperature responsive. A suitable temperature responsive chemical composition is available from Innovative Scientific Solutions, Inc.

For transmitting the pressure pulse 38 through the fluid in the tubular string 12, the system 10 includes a pressure pulse generator 52 attached to the tubular string. Actuation of the pressure pulse generator 52 is controlled by a controller 54 at the surface. The controller 54 is in communication with a computing system 56 which is also in communication with the optical signal transmitter/receiver 50.

The pressure pulse generator 52 may be an air gun which injects high pressure gas into the tubular string 12 to generate the pressure pulse 38, similar to the HalSonics™ system available from Halliburton Energy Services, Inc. of Houston, Tex. The pressure pulse generator 52 could be similar to either of those described in U.S. Pat. Nos. 5,754,495 and 6,321,838, the entire disclosures of which are incorporated herein by this reference.

The pressure pulse generator 52 could be a mud pulse telemetry pulser of the type used with flowing fluids in conventional measurement while drilling (MWD) systems and control of drilling tools. The pressure pulse generator 52 could be: 1) a positive pulse generator which utilizes an orifice restriction with a conical poppet which is translated into and out of the orifice, variably decreasing and then increasing the flow area to create a pulse, or 2) a negative pulse generator of the type used in MWD which employs a fast actuating gate valve to vent a portion of the flow to a lower pressure region, thereby creating a negative pulse.

It is not necessary for the pressure pulse 38 to be generated at the surface. A pressure pulse generator 56 could be positioned in the wellbore 14 as depicted in FIG. 1. As another alternative, a pressure pulse generator 58 could be positioned in a branch wellbore 70 (see FIG. 2). By positioning the pressure pulse generators 56, 58 in the well, the pressure pulses 38, 40 may have greater amplitude at the sensors 46, thereby making their detection easier.

It should be clearly understood that it is not necessary for the pressure pulse 38 to be generated as a momentary increase in pressure. For example, the pressure pulse 38 could be generated by momentarily decreasing pressure in the fluid in the tubular string 12. An evacuated chamber could be momentarily placed in fluid communication with the tubular string 12 in order to generate the pressure pulse 38. Alternatively, a piston rapidly moving in a cylinder in fluid communication with the tubular string 12 could be used to generate a positive and/or negative pressure pulse 38.

As used herein, the term "momentary" is used to indicate a relatively short duration (less than one second). Preferably, the transmitted pressure pulse 38 is short enough in duration for it to fully pass a set of sensors, and then the reflected pulse 40 travel back past the set of sensors 42, 44, with the two pulses not interfering with each other proximate the sensors 46, which would make their detection more complicated. For the transmitted pulse 38 to travel the entire length of a typical 10,000 ft. long tubular string 12 would take approximately two seconds if water is in the tubular string, somewhat longer if oil is in the tubular string. Thus, the momentary increase and/or decrease in pressure used to transmit the pulse 38 is preferably about 0.5 second or less in duration, and most preferably less than 0.1 second in duration.

Figure 2:
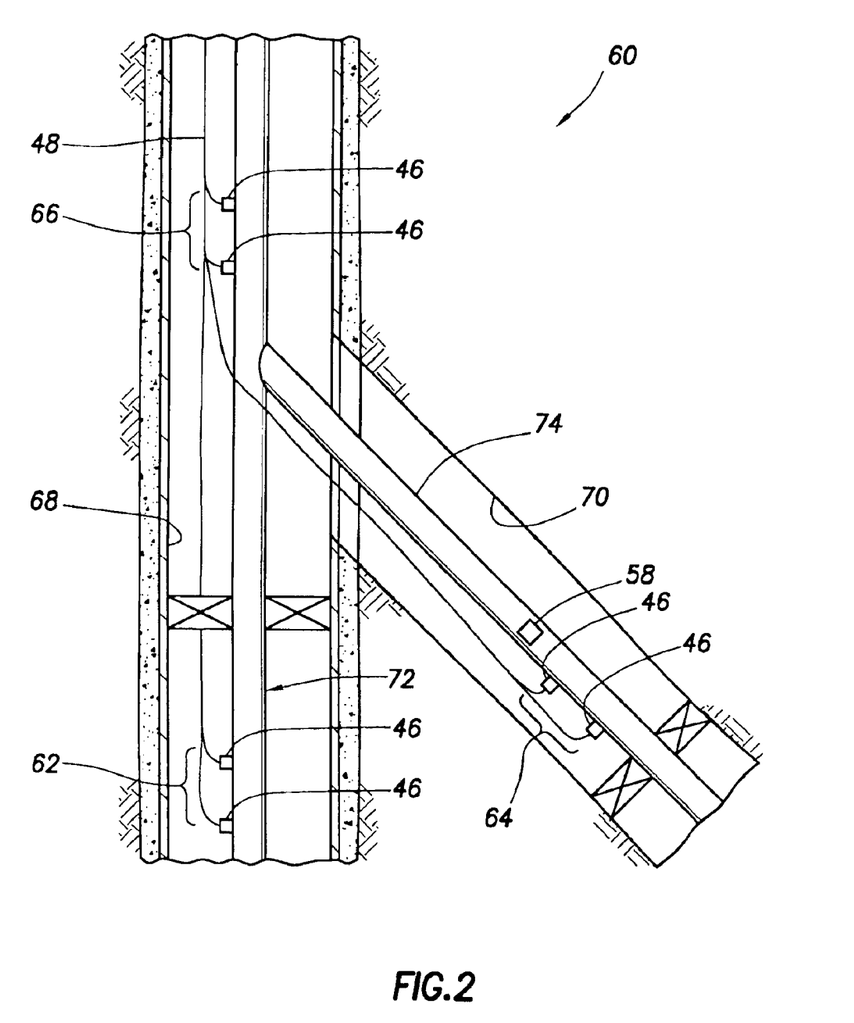
FIG. 2 is a schematic partially cross-sectional view of another system and method embodying principles of the invention.

Referring additionally now to FIG. 2, another system 60 and associated method are representatively illustrated. The system 60 is similar in many respects to the system 10 described above, so elements illustrated in FIG. 2 which are similar to those previously described are indicated using the same reference numbers. Note that the surface equipment (including the optical signal transmitter/receiver 50, pulse generator 52, controller 54 and computing system 56) are not shown in FIG. 2, but these or similar elements would in practice be included in the system 60, and located at the surface or other remote location.

As depicted in FIG. 2, the system 60 includes three sensor sets 62, 64, 66. Each sensor set includes two sensors 46. Each of the sensors 46 is preferably connected to the single fiber optic line 48 extending to the surface. As with the system 10, any type or number of sensors and sensor sets may be used, and any form of communication between the sensors and the surface (or other remote location) may be used, without departing from the principles of the invention.

The sensors 46 could each have a sensing element in fluid communication with the main flow, such as via a dead fluid cavity, although this is not necessary. These sensors 46 could be strain gauge or piezoelectric pressure sensors (electrical), and/or fiber optical equivalents (e.g., fiber Bragg grating or Fabry-Perot).

The sensor set 62 is positioned in a main or parent wellbore 68 below its intersection with a lateral or branch wellbore 70. The sensor set 62 is used to measure the velocity of fluid flowing through a tubular string 72, and the acoustic velocity in the fluid in the tubular string, as described above for the sensor set 42. Thus, the sensor set 62 may sense a transmitted pressure pulse and the pressure pulse reflected off of an impedance mismatch in the tubular string 72. The fluid flowing through the tubular string 72 at the sensor set 62 may originate from a zone intersected by the wellbore 68 below the intersection with the branch wellbore 70.

The sensor set 66 is used to measure the velocity of fluid flowing through the tubular string 72, and the acoustic velocity in the fluid, above the intersection between the wellbores 68, 70. The fluid flowing through the tubular string 72 at the sensor set 66 is a combination of the fluid flowing through the tubular string below the intersection between the wellbores 68, 70 and fluid entering the tubular string from the branch wellbore 70.

This is analogous to the situation in the system 10 as depicted in FIG. 1, wherein the fluid 24 enters the tubular string 12 between the sensor sets 42, 44. Thus, the two sensor sets 62, 66 may be used in the system 60 to determine the average flow velocities of the fluids in the tubular string 72 at each of the sensor sets, the compositions of the fluids at each of the sensor sets, the volumetric flow rates of the fluids at each of the sensor sets, etc. From these measurements, the contribution due to the fluid flowing into the tubular string 72 from the branch wellbore 70 may be readily determined.

If, however, it is desired to more directly determine these or other parameters of the fluid flowing into the tubular string 72 from the branch wellbore 70, the sensor set 64 may be used. The sensor set 64 is positioned in the branch wellbore 70.

As depicted in FIG. 2, a portion 74 of the tubular string 72 is positioned in the branch wellbore 70, and the sensor set 64 is attached to the tubular string portion 74. Fluid flowing through the portion 74 may originate from a zone intersected by the branch wellbore 70 below its intersection with the main wellbore 68.

The tubular string portion 74 may be considered as a part of the tubular string 72, or it may be considered a separate tubular string. In either case, the portion 74 is in fluid communication with the tubular string 72 in the main wellbore 68.

The transmitted and reflected pressure pulses 38, 40 will propagate through the fluid in the portion 74, since it is connected to the tubular string 72 in the main wellbore 68. However, note that the pressure pulse will be reflected off of an end of the portion 74 (or other impedance mismatch in the portion) in the branch wellbore 70, as well as being reflected off of an end of the tubular string 72 (or other impedance mismatch) in the main wellbore 68.

The sensor set 64 in the branch wellbore 70 will sense the transmitted pressure pulse 38, as well as the pressure pulse 40 reflected off of an impedance mismatch in the tubular string portion 74. Thus, the velocity and other parameters of the fluid flowing through the tubular string portion 74 in the branch wellbore 70 may be determined as described above.

Wellbores in which the principles of the invention are practiced, such as the branch wellbore 70, may be deviated from vertical as depicted in FIG. 2. Some wellbores may be so deviated that they extend substantially horizontal. In these circumstances, the fluid flowing through a tubular string in a wellbore may become at least partially stratified, that is, components of the fluid may separate into layers or strata in the tubular string. Since the components of the fluid typically have different densities and acoustic velocities, the sensors 46 could sense the transmitted and reflected pressure pulses 38, 40 differently in the different layers, which could lead to erroneous determinations being made from the sensor outputs.

Figure 3A:
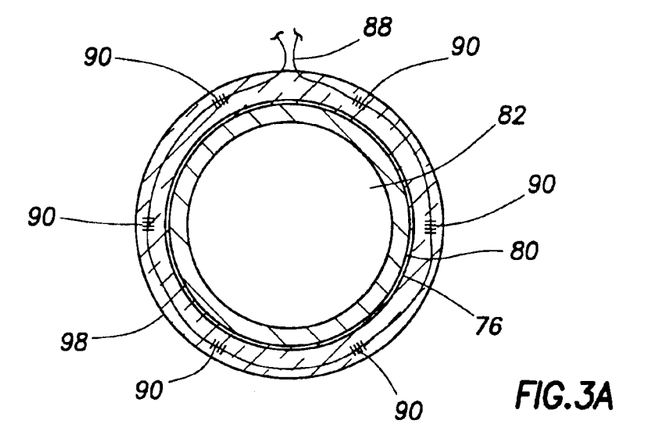
FIGS. 3A–C are schematic cross-sectional views of alternate configurations of sensors on a tubular string in the systems and methods of FIGS. 1 & 2.
Figure 3B:
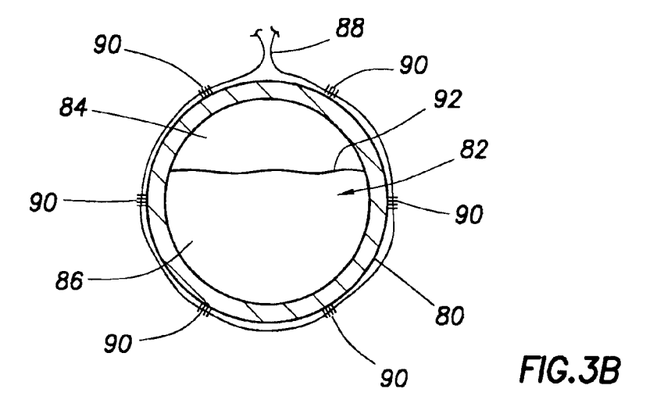
Figure 3C:
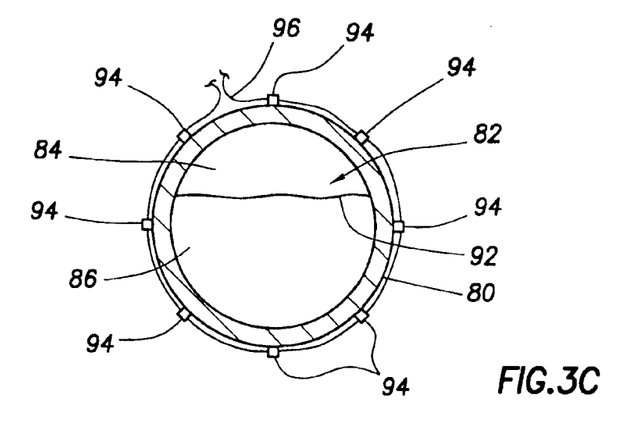

Referring additionally now to FIGS. 3B & C, three alternate cross-sectional views are depicted of a tubular string 80 in which fluid 82 therein is substantially stratified into an upper layer 84 and a lower layer 86. The upper layer 84 may be a relatively less dense fluid, such as oil, and the lower layer 86 may be a relatively more dense fluid, such as water. The tubular string 80 could be the portion 74 shown in FIG. 2, or it could be any other tubular string in which it is desired to sense the transmitted and reflected pressure pulses 38, 40.

In order to more precisely sense the transmitted and reflected pressure pulses 38, 40 accurately when the fluid 82 is stratified into the layers 84, 86, multiple sensors are circumferentially distributed about the tubular string 80. As depicted in FIG. 3B, an optical fiber 88 is wrapped externally about the tubular string 80. The optical fiber 88 senses hoop strain in the tubular string 80 to thereby sense the transmitted and reflected pressure pulses 38, 40.

Preferably, the optical fiber 88 has multiple strain sensors 90 formed thereon spaced apart around the circumference of the tubular string 80. The strain sensors 90 may be fiber Bragg gratings formed on the optical fiber 80, and may be of the type known as chirped gratings. Each of the gratings may be configured to reflect a different optical wavelength, allowing the responses of the gratings to be differentiated from each other in the optical signal transmitter/receiver 50.

Thus, instead of positioning single sensors 46 at longitudinally spaced apart locations along the tubular string 80, the multiple sensors go (which are circumferentially spaced apart) may be positioned at longitudinally spaced apart locations along the tubular string. This configuration permits the fluid velocity and acoustic velocity in each of the layers 84, 86 to be determined, as well as permitting the position of an interface 92 between the layers to be determined. The calculations for determining average fluid velocity and acoustic velocity would be the same as those represented above by equations 3 and 5, except that the calculations would be performed for each of the layers 84, 86.

In FIG. 3C the same stratified layers 84, 86 of the fluid 82 are depicted in the tubular string 80. However, in this configuration, multiple individual sensors 94 are positioned circumferentially about the tubular string. The sensors 94 may be any type of sensors, including strain sensors, pressure sensors, etc. Preferably, the sensors 94 are interferometric fiber optic strain sensors, such as Michelson, Fabry-Perot or Mach-Zehnder fiber optic sensors including small fiber coils, connected to a fiber optic line 96.

As with the sensors 90 depicted in FIG. 3B, the sensors 94 are arranged in a circumferential array about the tubular string 80, and preferably at least two of the arrays are used longitudinally spaced apart in a sensor set to sense the transmitted and reflected pressure pulses 38, 40. Note that a circumferential array of the sensors 94, or of the sensors 90, may be substituted for any of the sensors 46 in any of the sensor sets 42, 44, 62, 64, 66 described above.

In the schematic illustrations of the sensors 46, 90, 94 in FIGS. 1, 2, 3B & 3C, the sensors are depicted as being externally attached to the various tubular strings 12, 72, 80. However, it should be clearly understood that the sensors 46, 90, 94 may be otherwise positioned relative to the tubular strings, such as internal to the tubular strings, in sidewalls of the tubular strings, etc.

In those circumstances in which the sensors 46, 90, 94 are strain sensors, they may have difficulty sensing the transmitted and/or reflected pressure pulses 38, 40 if the resulting hoop strains in the respective tubular string 12, 72, 80 are very small. In order to amplify the hoop strain so that it is more easily sensed by the sensors 46, 90, 94, a relatively low modulus material may be applied to the respective tubular string 12, 72, 80, so that the hoop strain is increased.

Referring additionally now to FIG. 3A, the tubular string 80 is depicted with the optical fiber 88 extending circumferentially about the tubular string. However, instead of the optical fiber 88 being attached directly to the tubular string 80, it is embedded in a relatively compliant coating 98, such as a polymer coating, on the tubular string. This positions the sensors 90 on the optical fiber 88 farther radially outward where greater hoop strain will be experienced by the sensors due to the transmitted and reflected pressure pulses 38, 40 propagated through the fluid 82.

If a pressure responsive chemical composition (such as a pressure sensitive paint or pressure sensitive coating 76) is used as discussed above, instead of or in addition to the individual sensors 90, 94, then the chemical composition may extend circumferentially about the tubular string 80. In this manner, the chemical composition would be able to sense the pressure pulses 38, 40 in each of the layers 84, 86. In this manner, the chemical composition 76 may be used sense temperature circumferentially about the tubular string 80, as well.

In each of the systems 10, 60 and sensor configurations depicted in FIGS. 3A–C, multiple sensors 46, 90, 94 are used. As described above, these sensors 46, 90, 94 are preferably fiber optic sensors. For convenient installation in a well, these sensors 46, 90, 94 are also preferably connected to, or formed on, a single fiber optic line or optical fiber 48, 88, 96.

Figure 4:
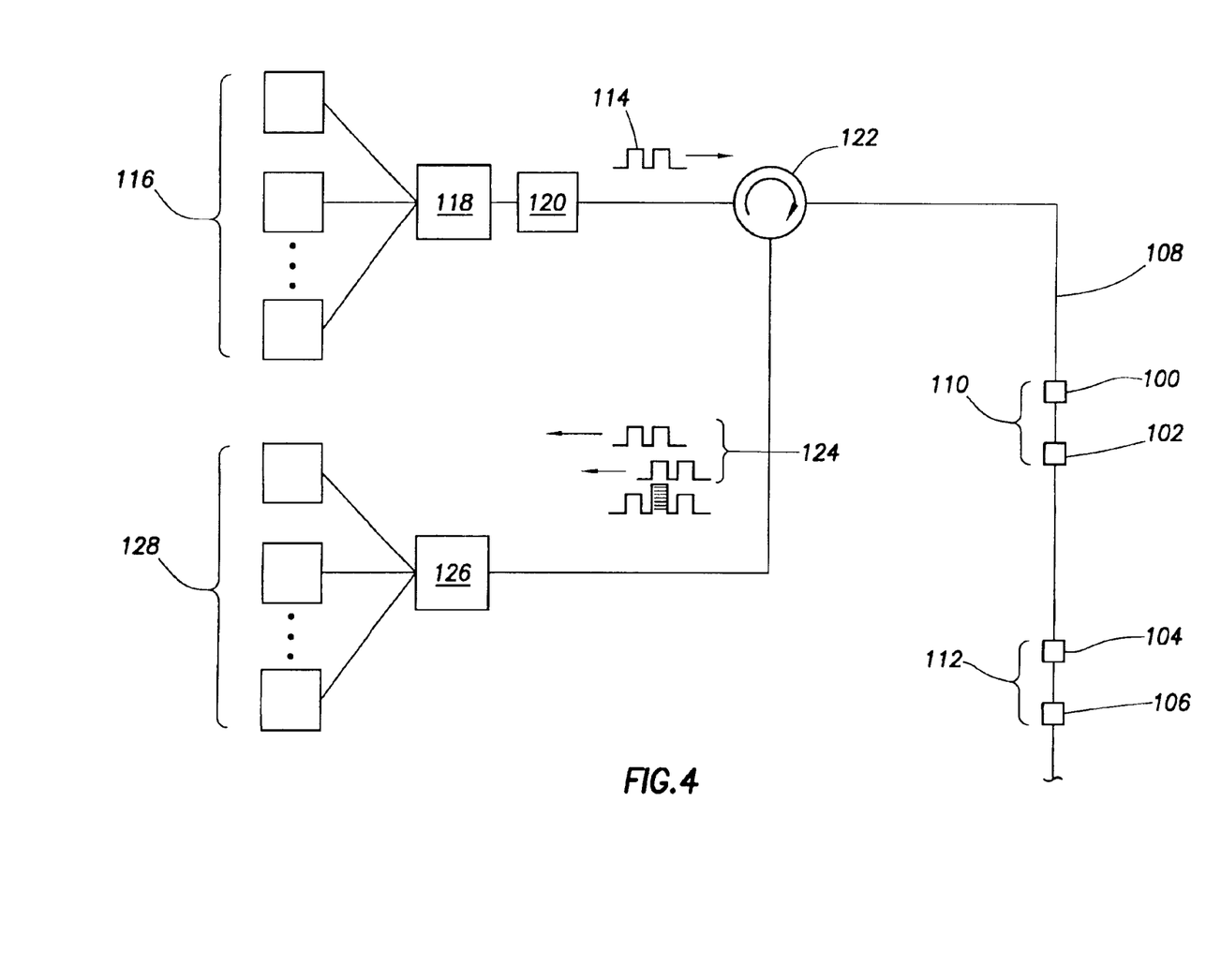
FIG. 4 is a schematic diagram of a multiplexing method which may be used in the systems and methods of FIGS. 1 & 2.

Referring additionally now to FIG. 4, one method of multiplexing multiple sensors 100, 102, 104, 106 on a single fiber optic line 108 is depicted. This method utilizes wavelength division multiplexing in a manner similar to that described in U.S. Pat. No. 4,996,419 or in G. A. Miller et al., OFS-2002, PD-1, May 2002, the entire disclosures of which are incorporated herein by this reference.

In this method, the sensors 100, 102, 104, 106 are narrow band fiber Bragg gratings arranged in sets (in this case, pairs) 110, 112 of the sensors. A pulse-modulated optical signal 114 (for example, including two pulses) is generated by one or more fixed-wavelength lasers 116 and transmitted through a WDM multiplexer 118 (or using a variable-wavelength laser) and a modulator 120, and the optical signal is launched into the fiber optic line 108 through a circulator 122.

Each sensor set 110, 112 reflects the optical signal, resulting in four pulses being included in a reflected optical signal 124 from each sensor set. The optical signal 114 pulse repetition rate is selected so that the second and third reflected pulse in each reflected optical signal 124 overlap and interfere. This overlapping and interference is depicted in FIG. 4 below the reflected optical signal 124.

The co-sinusoidal interferometric signal in each reflected optical signal 124 is gated and the phase change measured at base-bands, or by using a homodyne modulation to shift the phase detection to an RF frequency carrier. The sensor sets 110, 112 can be multiplexed both in the time domain and the wavelength domain by separating the wavelength response of each sensor set widely enough, so that they can be time-gated (demultiplexed) without crosstalk from any optical signals due to sensing reflected pressure pulses in any other sensor set or any other optical signals for other sensor sets.

As depicted in FIG. 4, a WDM demultiplexer 126 receives the reflected optical signal 124 from the circulator 122 and transmits the demultiplexed signal to one or more photodetectors or opto-electric converters 128. The lasers 116, multiplexer 118, modulator 120, circulator 122, demultiplexer 126 and photodetectors 128 may be included in the optical signal transmitter/receiver 50.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A system for determining at least one parameter of a fluid in a tubular string, the system comprising:
   a pressure pulse generator transmitting a pressure pulse through the fluid in the tubular string; and
   at least a first set of sensors utilized in determining a velocity of the pressure pulse transmitted through the fluid.

2. The system according to claim 1, wherein the first set of sensors is utilized in determining a velocity of the pressure pulse reflected back through the fluid.

3. The system according to claim 1, wherein at least one of the sensors is a fiber optical sensor.

4. The system according to claim 1, wherein an open end of the tubular string reflects the pressure pulse back through the fluid to the first set of sensors.

5. The system according to claim 1, wherein an impedance mismatch reflects the pressure pulse back through the fluid to the first set of sensors.

6. The system according to claim 1, further comprising a second set of sensors sensing the transmitted pressure pulse.

7. The system according to claim 6, wherein the second set of sensors is utilized in determining a velocity of the pressure pulse reflected back through the fluid.

8. The system according to claim 6, wherein the first set of sensors is positioned at a first portion of the tubular string, and wherein the second set of sensors is positioned at a second portion of the tubular string spaced apart from the first portion.

9. The system according to claim 6, wherein the first set of sensors is positioned in a first wellbore, and wherein the second set of sensors is positioned in a second wellbore which intersects the first wellbore.

10. The system according to claim 1, wherein the first set of sensors is positioned in an external coating on the tubular string, the coating amplifying strain due to the pressure pulse in the tubular string.

11. The system according to claim 1, wherein the fluid is a combination of at least first and second components which are substantially stratified within the tubular string, and wherein the first set of sensors is distributed circumferentially about the tubular string, so that a first portion of the sensors senses the pressure pulse transmitted through the first component, and a second portion of the sensors senses the pressure pulse transmitted through the second component.

12. The system according to claim 11, wherein each sensor of the first set of sensors is connected to a single fiber optic line.

13. The system according to claim 11, wherein each sensor of the first set of sensors is formed on a single fiber optic line.

14. A method of determining at least one parameter of a fluid in a tubular string, the method comprising the steps of:
    transmitting a pressure pulse through the fluid in the tubular string, thereby causing the pressure pulse to reflect back through the fluid;
    determining a first velocity of the transmitted pressure pulse; and
    determining a second velocity of the reflected pressure pulse.

15. The method according to claim 14, further comprising the step of calculating an average velocity of the fluid in the tubular string.

16. The method according to claim 15, wherein the calculating step is performed by a method including the steps of determining a difference between the first and second velocities, and dividing the difference by two.

17. The method according to claim 14, further comprising the step of calculating an average acoustic speed of sound in the fluid in the tubular string.

18. The method according to claim 17, wherein the average acoustic speed calculating step is performed by a method including the steps of determining a sum of the first and second velocities, and dividing the sum by two.

19. The method according to claim 14, wherein each of the determining steps further comprises sensing the pressure pulse via a first set of sensors spaced apart a first predetermined distance along the tubular string.

20. The method according to claim 19, wherein each of the determining steps further comprises dividing the first predetermined distance by a difference between times of arrival of the pressure pulse at each of the sensors of the first set of sensors.

21. The method according to claim 19, further comprising the step of determining times of arrival of the pressure pulse by cross-correlating signals produced by sensors of the first set of sensors in response to the pressure pulse.

22. The method according to claim 19, further comprising the step of determining times of arrival of the pressure pulse by determining leading edges of signals produced by sensors of the first set of sensors in response to the pressure pulse.

23. The method according to claim 19, wherein each sensor of the first set of sensors is a fiber optic sensor.

24. The method according to claim 19, wherein each sensor of the first set of sensors is a hydrophone.

25. The method according to claim 19, wherein each sensor of the first set of sensors is a geophone.

26. The method according to claim 19, wherein each sensor of the first set of sensors is a strain sensor.

27. The method according to claim 19, wherein each sensor of the first set of sensors is a pressure sensor.

28. The method according to claim 19, wherein each sensor of the first set of sensors is an accelerometer.

29. The method according to claim 19, wherein the first set of sensors is included in a Raman scattering distributed temperature sensing system.

30. The method according to claim 19, wherein the first set of sensors is included in a Brillouin distributed strain sensing system.

31. The method according to claim 19, wherein each sensor of the first set of sensors is a fiber Bragg grating temperature sensor.

32. The method according to claim 19, wherein each sensor of the first set of sensors includes a chemical composition which responds to the pressure pulse.

33. The method according to claim 19, wherein at least one sensor of the first set of sensors senses a parameter different from a parameter sensed by another sensor of the first set of sensors.

34. The method according to claim 19, further comprising the step of connecting each sensor of the first set of sensors to a single fiber optic line.

35. The method according to claim 34, further comprising the step of transmitting an optical signal through the fiber optic line to each sensor of the first set of sensors.

36. The method according to claim 35, wherein the light transmitting step further comprises multiplexing the optical signal, thereby permitting a response of each of the sensors of the first set of sensors to be demultiplexed in an optical signal receiver.

37. The method according to claim 36, wherein the multiplexing step further comprises wavelength division multiplexing the optical signal.

38. The method according to claim 36, wherein the multiplexing step further comprises time division multiplexing the optical signal.

39. The method according to claim 19, wherein each of the determining steps further comprises sensing the pressure pulse via a second set of sensors spaced apart a second predetermined distance along the tubular string.

40. The method according to claim 39, wherein each of the determining steps further comprises dividing the first predetermined distance by a difference between times of arrival of the pressure pulse at each sensor of the first set of sensors, and dividing the second predetermined distance by a difference between times of arrival of the pressure pulse at each sensor of the second set of sensors.

41. The method according to claim 39, further comprising the steps of determining the times of arrival of the pressure pulse at the first set of sensors by cross-correlating signals produced by the sensors of the first set of sensors in response to the pressure pulse, and determining the times of arrival of the pressure pulse at the second set of sensors by cross-correlating signals produced by the sensors of the second set of sensors in response to the pressure pulse.

42. The method according to claim 39, further comprising the steps of determining the times of arrival of the pressure pulse at the first set of sensors by determining leading edges of signals produced by the sensors of the first set of sensors in response to the pressure pulse, and determining the times of arrival of the pressure pulse at the second set of sensors by determining leading edges of signals produced by the sensors of the second set of sensors in response to the pressure pulse.

43. The method according to claim 39, wherein the first velocity determining step further comprises determining the first velocity at each of the first and second sets of sensors, and wherein the second velocity determining step further comprises determining the second velocity at each of the first and second sets of sensors.

44. The method according to claim 43, further comprising the steps of positioning the first set of sensors at a first portion of the tubular string, and positioning the second set of sensors at a second portion of the tubular string.

45. The method according to claim 44, further comprising the step of calculating an average velocity of the fluid in each of the first and second portions of the tubular string by determining a difference between the first and second velocities at each of the first and second sets of sensors, and dividing each difference by two.

46. The method according to claim 45, further comprising the step of calculating a difference between the average velocity of the fluid in the first portion of the tubular string and the average velocity of the fluid in the second portion of the tubular string.

47. The method according to claim 46, further comprising the step of multiplying the difference between the average velocity of the fluid in each of the first and second portions of the tubular string by a cross-sectional area of the tubular string, thereby determining a differential volumetric flow rate of the fluid between the first and second sets of sensors.

48. The method according to claim 47, wherein in the differential volumetric flow rate determining step, the differential volumetric flow rate is a rate at which the fluid is added to the tubular string between the first and second sets of sensors.

49. The method according to claim 47, wherein in the differential volumetric flow rate determining step, the differential volumetric flow rate is a rate at which the fluid is discharged from the tubular string between the first and second sets of sensors.

50. The method according to claim 44, further comprising the step of calculating an average acoustic speed of sound in the fluid in each of the first and second portions of the tubular string by determining a sum of the first and second velocities at each of the first and second sets of sensors, and dividing each sum by two.

51. The method according to claim 50, further comprising the step of calculating a difference between the average speed of sound in the fluid in the first portion of the tubular string and the average speed of sound in the fluid in the second portion of the tubular string.

52. The method according to claim 51, wherein the fluid is a combination of at least first and second components, each of the first and second components having a known density, and further comprising the step of calculating a volume fraction of each of the first and second components of the fluid in each of the first and second portions of the tubular string from the known densities of the first and second components and the average speed of sound in the first and second portions of the tubular string.

53. The method according to claim 52, further comprising the steps of adding fluid to the tubular string between the first and second sets of sensors, and calculating a difference between the volume fractions of each of the first and second components of the fluid in each of the first and second portions of the tubular string to thereby determine a volume fraction of each of the first and second components of the fluid added to the tubular string between the first and second sets of sensors.

54. The method according to claim 39, further comprising the step of positioning the first and second sets of sensors in a single wellbore.

55. The method according to claim 39, further comprising the steps of positioning the first set of sensors in a first wellbore, and positioning the second set of sensors in a second wellbore which intersects the first wellbore.

56. The method according to claim 39, wherein each sensor of the first and second sets of sensors is a fiber optic sensor.

57. The method according to claim 39, wherein each sensor of the first and second sets of sensors is a hydrophone.

58. The method according to claim 39, wherein each sensor of the first and second sets of sensors is a geophone.

59. The method according to claim 39, wherein each sensor of the first and second sets of sensors is a strain sensor.

60. The method according to claim 39, wherein each sensor of the first and second sets of sensors is a pressure sensor.

61. The method according to claim 39, wherein each sensor of the first and second sets of sensors is an accelerometer.

62. The method according to claim 39, wherein the first and second sets of sensors are included in a Raman scattering distributed temperature sensing system.

63. The method according to claim 39, wherein the first and second sets of sensors are included in a Brillouin distributed strain sensing system.

64. The method according to claim 39, wherein each sensor of the first and second sets of sensors is a fiber Bragg grating temperature sensor.

65. The method according to claim 39, wherein each sensor of the first and second sets of sensors includes a chemical composition which responds to the pressure pulse.

66. The method according to claim 39, wherein at least one sensor of the first set of sensors senses a parameter different from a parameter sensed by another sensor of the first set of sensors.

67. The method according to claim 39, wherein at least one sensor of the second set of sensors senses a parameter different from a parameter sensed by another sensor of the second set of sensors.

68. The method according to claim 39, further comprising the step of connecting each sensor of the first and second sets of sensors to a single fiber optic line.

69. The method according to claim 68, further comprising the step of transmitting an optical signal through the fiber optic line to each sensor of the first and second sets of sensors.

70. The method according to claim 69, wherein the light transmitting step further comprises multiplexing the optical signal, thereby permitting a response of each of the sensors of the first and second sets of sensors to be demultiplexed in an optical signal receiver.

71. The method according to claim 70, wherein the multiplexing step further comprises wavelength division multiplexing the optical signal.

72. The method according to claim 70, wherein the multiplexing step further comprises time division multiplexing the optical signal.

73. The method according to claim 14, wherein the reflecting step further comprises reflecting the pressure pulse off of a closed end of the tubular string.

74. The method according to claim 14, wherein the reflecting step further comprises reflecting the pressure pulse off of an open end of the tubular string.

75. The method according to claim 14, wherein each of the determining steps further comprises sensing the pressure pulse using at least one strain sensor positioned in an external coating on the tubular string, the coating amplifying strain due to the pressure pulse in the tubular string.

76. The method according to claim 14, wherein each of the determining steps further comprises sensing the pressure pulse using multiple sensors distributed circumferentially about the tubular string.

77. The method according to claim 76, further comprising the step of connecting each of the sensors to a single fiber optic line.

78. The method according to claim 76, further comprising the step of forming each of the sensors on a single fiber optic line.

79. The method according to claim 78, wherein the forming step further comprises forming each of the sensors as a grating pattern on the fiber optic line.

80. The method according to claim 76, wherein the fluid is stratified within the tubular string, so that at least first and second components of the fluid are substantially separated in the tubular string, and wherein each of the determining steps further comprises determining each of the first and second velocities in the first component using a first set of the sensors, and determining each of the first and second velocities in the second component using a second set of the sensors.

81. The method according to claim 14, wherein the transmitting step further comprises transmitting the pressure pulse as a momentary increase in pressure in the tubular string.

82. The method according to claim 14, wherein the transmitting step further comprises transmitting the pressure pulse as a momentary decrease in pressure in the tubular string.

83. The method according to claim 14, further comprising the step of sensing a temperature of the fluid in the tubular string.

84. The method according to claim 83, further comprising the steps of calculating an average density of the fluid in the tubular string using the first and second velocities, and correcting the average density using the sensed temperature of the fluid.

85. The method according to claim 83, wherein the temperature sensing step is performed by transmitting light through a fiber optic line extending along the tubular string.

86. The method according to claim 85, wherein the first and second velocities determining steps further comprise sensing the pressure pulse using at least two sensors connected to the fiber optic line.

87. The method according to claim 14, further comprising the step of sensing ambient pressure of the fluid in the tubular string.

88. The method according to claim 87, wherein the ambient pressure sensing step is performed by transmitting light through a fiber optic line extending along the tubular string.

89. The method according to claim 88, wherein the first and second velocities determining steps further comprise sensing the pressure pulse using at least two sensors connected to the fiber optic line.

90. The method according to claim 14, where in the transmitting step further comprises connecting a pressure pulse generator to the tubular string at a surface of the earth.

91. The method according to claim 14, wherein the transmitting step further comprises positioning a pressure pulse generator in a wellbore with the tubular string.

92. The method according to claim 14, wherein the transmitting step further comprises positioning a pressure pulse generator in a branch wellbore.

* * * * *